(12) United States Patent
Flores

(10) Patent No.: US 6,491,339 B2
(45) Date of Patent: Dec. 10, 2002

(54) APPARATUS FOR REPAIRING A SAGGING AUTOMOBILE HEADLINER

(76) Inventor: Eddie Flores, 8117 W. Dreyfus Dr., Peoria, AZ (US) 85345

( * ) Notice: Subject to any disclaimer, the term of this patent is extended or adjusted under 35 U.S.C. 154(b) by 157 days.

(21) Appl. No.: 09/729,328

(22) Filed: Dec. 5, 2000

(65) Prior Publication Data

US 2002/0109378 A1 Aug. 15, 2002

(51) Int. Cl.$^7$ ................................................ B60R 13/02
(52) U.S. Cl. ........................................................ 296/214
(58) Field of Search ................................ 296/210, 214; 160/80

(56) References Cited

U.S. PATENT DOCUMENTS

| 3,065,022 A | * | 11/1962 | Schutte | 296/214 |
| 4,172,918 A | * | 10/1979 | Doerer | 428/174 |
| 4,323,276 A | * | 4/1982 | Hira et al. | 296/214 |
| 4,423,902 A | * | 1/1984 | Yaotani et al. | 296/214 |
| 4,461,509 A | * | 7/1984 | Yoatani et al. | 211/182 |
| 4,600,621 A | * | 7/1986 | Maurer et al. | 428/121 |
| 4,971,388 A | * | 11/1990 | Kanggs | 296/214 |
| 5,449,032 A | * | 9/1995 | Blevins et al. | 160/80 |
| 5,503,903 A | * | 4/1996 | Bainbridge et al. | 428/182 |
| 5,624,151 A | * | 4/1997 | Guswiler | 296/214 |

* cited by examiner

Primary Examiner—D. Glenn Dayoan
Assistant Examiner—Paul Chenevert
(74) Attorney, Agent, or Firm—Anderson & Morishita

(57) ABSTRACT

A headliner repair apparatus employed to repair a sagging automobile headliner. The headliner repair apparatus comprises a thin, flexible rod fabricated from either metal or plastic, and a rod clip, which would allow the rod to be used on automobiles that would have no headliner molding. The rod clip would have teeth on its bottom surface which would allow a headliner to be removably mounted on the bottom surface of the rod clip. The rod clip would also have an incorporated extending tab on the bottom surface of the rod clip, which would allow the rod to be inserted into the rod clip.

3 Claims, 3 Drawing Sheets

APPARATUS FOR REPAIRING A SAGGING AUTOMOBILE HEADLINER

BACKGROUND OF THE INVENTION

The present invention is that of a newly designed apparatus for repairing a sagging automobile headliner.

DESCRIPTION OF THE PRIOR ART

U.S. Pat. No. 5,624,151, issued to Guswiler, discloses a headliner which consists of two elongate members which are selectively attachable together and which can be springedly and flexibly retained against a vehicle's headliner.

U.S. Pat. No. 5,503,903, issued to Bainbridge et al., discloses a self-supporting headliner panel for lining the interior surface of an automobile roof, which comprises a front sheet, a back sheet, and an intermediate corrugated sheet adhered to the front and back sheets.

U.S. Pat. No. 5,449,032, issued to Blevins et al., discloses an improved adjustable rib for use with an awning support apparatus which in turn is used with an awning having one end attached to a wall and the second end attached to an awning support tube that is held a predetermined distance from one end of the awning, measured along the awning, by a pair of side frames attached to the wall.

U.S. Pat. No. 4,971,388, issued to Knaggs, discloses an assembly for supporting a headliner along the selected cross-body contour of a vehicle including a resiliently flexible strip curtable to a length longer than the horizontal length but not longer than the peripheral length of the selected cross-body contour of a vehicle roof and further, includes a pair of devices for mounting the strip at each end of the cross-body contour for supporting the headliner.

U.S. Pat. No. 4,600,621, issued to Maurer et al., discloses a thermoformable laminate structure with a retroflexed margin that comprises at least one sheet of thermoplastic foam having a polymer impregnated cloth adhered to at least one side thereof.

U.S. Patent No. 4,172,918, issued to Doerer, discloses a contoured self-supporting automotive liner panel, such as an headliner, which comprises an outer substrate layer of expanded plastics material which is relatively rigid and has a substantial resistance to bending, an intermediate layer of relatively soft, compressible, flexible, expanded plastics material, and an outer flexible decorative finish cover layer.

SUMMARY OF THE INVENTION

The present invention is that of a newly designed apparatus for repairing a sagging automobile headliner. The present invention comprises a thin, flexible rod fabricated from either metal or plastic. The rod is available in a certain length, preferably at least 4 feet 9 inches long, that would make the rod a "one-size-fits-all" device. A user would then be able to cut the rod to a required length that would be needed for a particular vehicle. The present invention would also include a rod clip, which would allow the rod to be used on automobiles that would have no headliner molding. The rod clip would have teeth on its bottom surface which would allow the headliner to be removably mounted on the bottom surface of the rod clip. The rod clip would also have an incorporated extending tab on the bottom surface of the rod clip, which would allow the rod to be inserted into the rod clip.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regard as including such equivalent constructions insofar as they do not depart from the spirit and scope of the present invention.

It is therefore an object of the present invention to provide a new and improved apparatus for repairing a sagging automobile headliner which has all of the advantages of the prior art headliners and none of the disadvantages.

It is another object of the present invention to provide a new and improved apparatus for repairing a sagging automobile headliner which may be easily and efficiently manufactured and marketed.

It is still another an object of the present invention to provide a new and improved apparatus for repairing a sagging automobile headliner which is of durable and reliable construction.

It is yet another object of the present invention to provide a new and improved apparatus for repairing a sagging automobile headliner which is economically affordable and available to the buying public.

It is yet another object of the present invention to provide a new and improved apparatus for repairing a sagging automobile headliner that can be easily and quickly installed.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
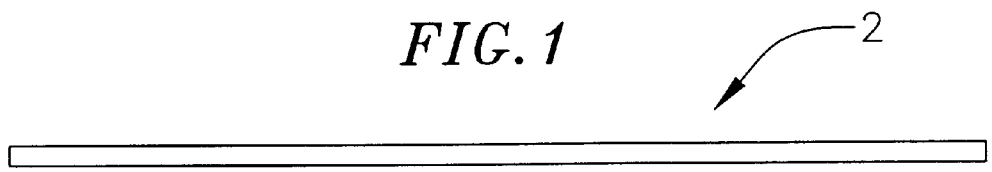
FIG. 1 shows a top view of the rod of the present invention.
Figure 2:
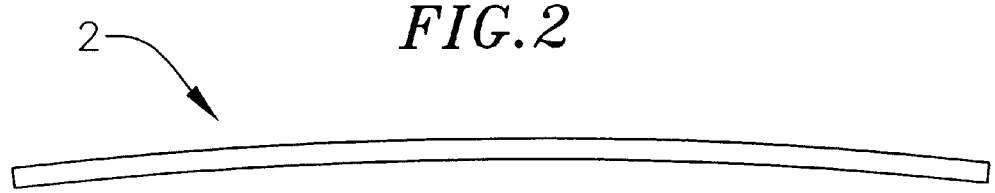
FIG. 2 shows a side view of the rod of the present invention.

FIGS. 1 and 2 shows top and side views, respectively, of rod 2 of the present invention. Rod 2 is a thin, flexible rod fabricated from either metal or plastic. Rod 2 would preferably be approximately 4 feet 9 inches in length, which would allow a user to either use rod 2 or cut rod 2 to an appropriate length to fit the width of a headliner of a specific vehicle.

If rod 2 is fabricated from metal, rod 2 would not need to be thicker than 3/16 of an inch. If rod 2 were fabricated from plastic, rod 2 should not be thicker than 3/8 of an inch. If rod 2 were fabricated from plastic, the plastic would preferably be a clear-see-through-type plastic, which would allow rod 2 to blend in a headliner on a wide variety of vehicles.

Figure 3:
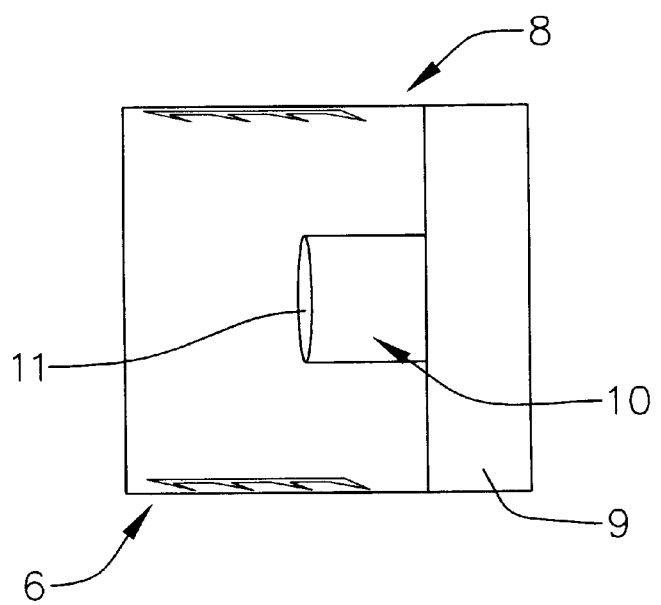
FIG. 3 shows a top view of the rod clip, tab attachment, and incorporated tab of the present invention.
Figure 4:
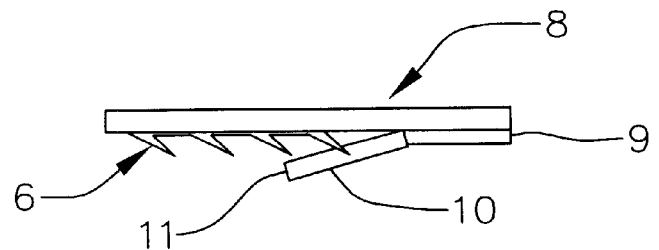
FIG. 4 shows a side view of the rod clip, tab attachment, and incorporated tab of the present invention.

FIGS. 3 and 4 show top and side views, respectively, of rod clip 8, tab attachment 9, and incorporated tab 10. As can be seen, rod clip 8 is fabricated in a flat rectangular shape and has two surfaces, a top surface and a bottom surface. Rod clip 8 also has two ends, a first end and a second end.

Tab attachment 9 is attached to the bottom surface of rod clip 8 near the second end of rod clip 8. Tab attachment 9 is rectangular and is attached to the bottom surface of rod clip 8 at the second end of rod clip 8. As can be seen in FIG. 4, a plurality of teeth 6 are attached to the bottom surface of rod clip 8. The plurality of teeth 6 begin near the first end of rod clip 8 and continue approximately two-thirds of the way to the second end of rod clip 8. The plurality of teeth 6 are evenly spaced out and angled downward toward the second end of rod clip 8.

Incorporated tab 10 is a short hollow tube which has two ends, a first end and a second end, with the first end attached to tab attachment 9. From the first end of incorporated tab 10 to the second end of incorporated tab 10, incorporated tab 10 travels downward from the bottom surface of rod clip 8. The second end of incorporated tab 10 culminates in opening 11, which would be capable of receiving an end of rod 2.

Figure 5:
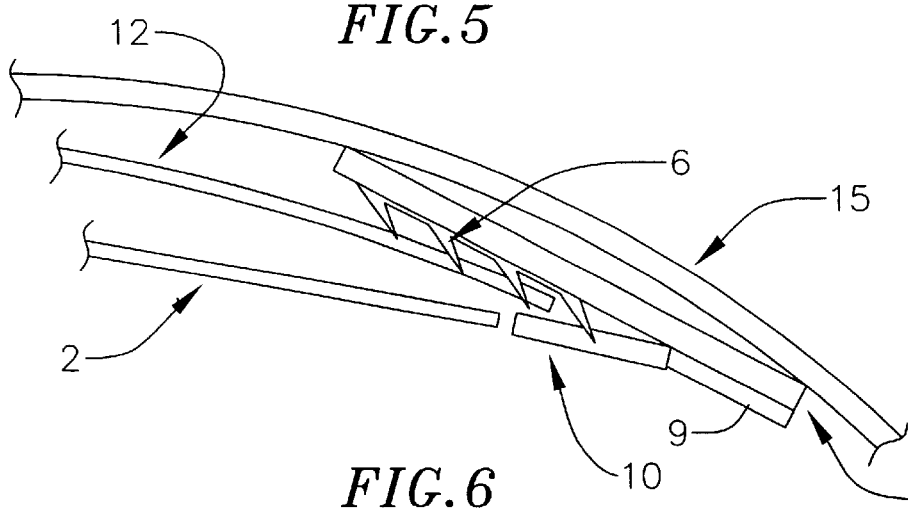
FIG. 5 provides a side view of the present invention showing the interaction of the present invention with a headliner in a vehicle.

FIG. 5 provides a side view of the present invention showing the interaction of the present invention with headliner 12 in a vehicle. As can be seen, substantially all of the portion of rod clip 8 with a plurality of teeth 6 would be placed above headliner 12, with the second end of incorporated tab 10 sticking out and being located immediately under an edge of headliner 12 of a vehicle. Headliner 12 would be attached to one or more teeth 6 on the bottom surface of rod clip 8, which would allow rod clip 8 to remain relatively hidden. An end of rod 2 would insert into opening 11 located on the second end of incorporated tab 10 when a user would wish to place rod 2 of the present invention to hold a sagging headliner to a roof 15.

Figure 6:
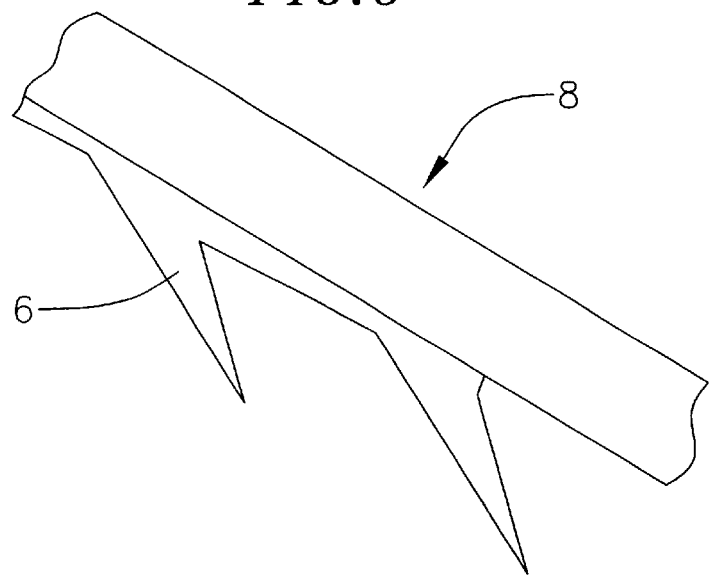
FIG. 6 shows a close-up side view of a rod clip with an incorporated plurality of teeth attached to the bottom surface of the rod clip.

FIG. 6 shows a close-up side view of rod clip 8 with incorporated plurality of teeth 6 attached to the bottom surface of rod clip 8. As can be seen, each tooth 6 angles downward and toward the direction of the second end of rod clip 8.

Figure 7:
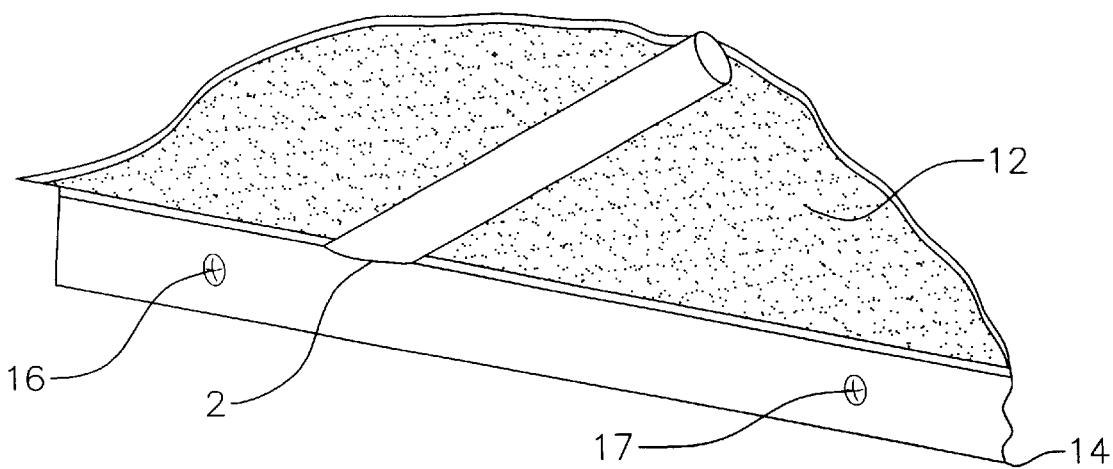
FIG. 7 shows an isometric view of a rod interacting with the molding of a car.

FIG. 7 shows an isometric view of rod 2 interacting with molding 14 of a car. Molding 14 is held in by screws 16 and 17. When the present invention is properly used, as shown in FIG. 7, rod clip 8 would not be visible.

Figure 8:
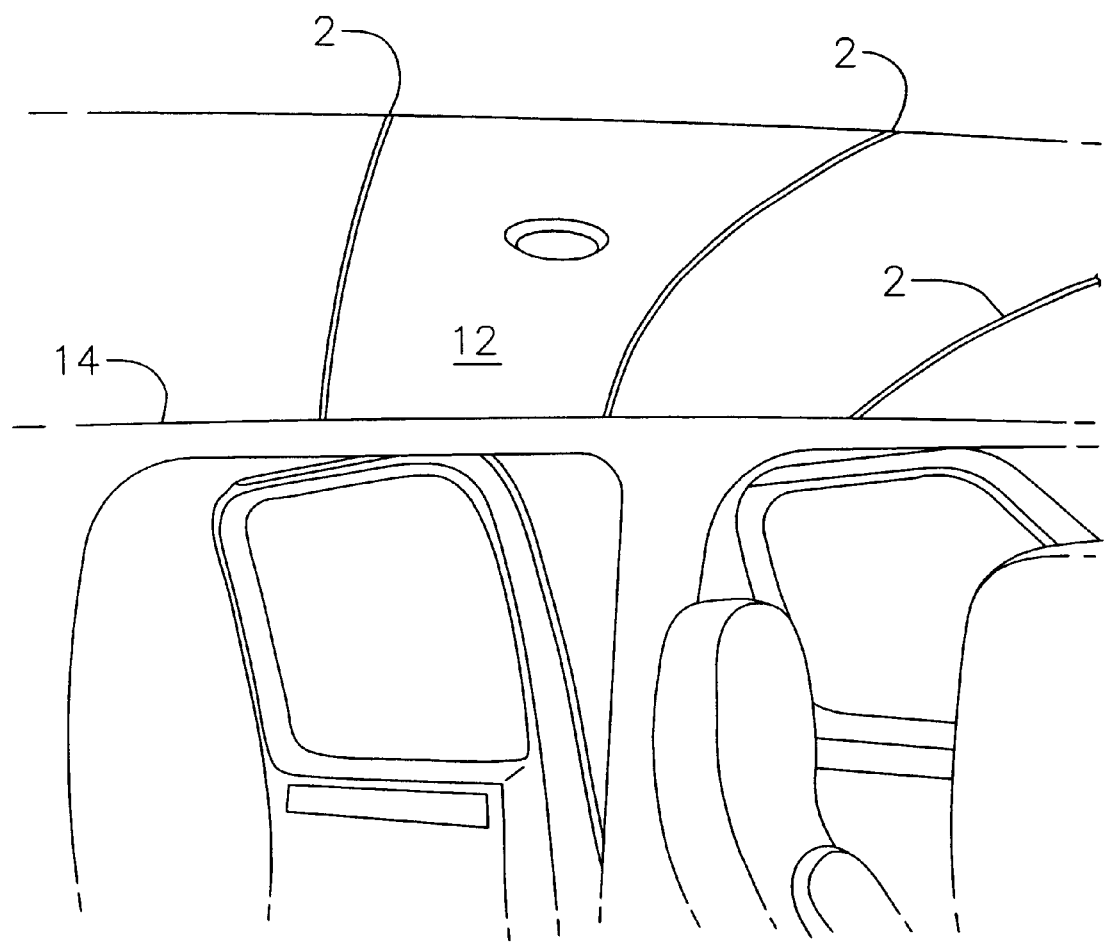
FIG. 8 shows a perspective view of the interior of a vehicle with a plurality of rods being used.

FIG. 8 shows a perspective view of the interior of a car, with a plurality of rods 2 being used. As can be seen, the present invention properly and effectively aids in repairing a sagging headliner. Rather than pay to get an entirely new headliner, the present invention could be used for the duration of the life of a car, thereby saving a user money.

What I claim as my invention is:

1. A headliner repair apparatus, the headliner repair apparatus comprising:

a rod clip, the rod clip being designed in a flat rectangular shape and having two surfaces, a top and a bottom surface, the top surface of the rod clip being attached to a roof within a vehicle, the rod clip also having two ends, a first end and a second end, the rod clip including a plurality of teeth attached to the bottom surface of the rod clip from the first end of the rod clip to approximately two-thirds of the way to the second end of the rod clip, the plurality of teeth being evenly spaced out and angled downward away from the first end and toward the second end of the rod clip, a tab attachment, the tab attachment being rectangular and being attached to the bottom surface of the rod clip near the second end of the rod clip, an incorporated tab, the incorporated tab being a short hollow tube with two ends, a first and a second end, the first end of the incorporated tab being attached to the tab attachment, the incorporated tab angling downward and away from the tab attachment as the incorporated tab goes from the first end of the incorporated tab to the second end of the incorporated tab, the second end of the incorporated tab culminating in a round opening, a headliner, the headliner having at least one end, a rod, the rod having two ends, a first end and a second end, the first end being circular, and the second end being circular, whereby an end of the headliner would be attached to at least one tooth on the bottom surface of the rod clip, at which time, an end of the rod would be inserted into the opening of second end of the incorporated tab in an effort to prevent or eliminate sagging in a headliner, whereby the rod would keep the headliner in contact with the inside roof of a vehicle.

2. A rod according to claim 1, wherein said rod would be fabricated from metal.

3. A rod according to claim 1, wherein said rod would be fabricated from plastic.

* * * * *